(12) United States Patent
Shirane et al.

(10) Patent No.: US 7,263,251 B2
(45) Date of Patent: Aug. 28, 2007

(54) OPTICAL SWITCH HAVING PHOTONIC CRYSTAL STRUCTURE

(75) Inventors: Masayuki Shirane, Tokyo (JP);
Masatoshi Tokushima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/181,722

(22) Filed: Jul. 15, 2005

(65) Prior Publication Data

US 2005/0249455 A1    Nov. 10, 2005

Related U.S. Application Data

(62) Division of application No. 10/105,384, filed on Mar. 26, 2002, now Pat. No. 6,937,781.

(30) Foreign Application Priority Data

Apr. 4, 2001    (JP) .............................. 2001-106318

(51) Int. Cl.
*G02B 6/26* (2006.01)
*G02B 6/42* (2006.01)

(52) U.S. Cl. .................... 385/16; 385/40; 385/130; 359/320; 359/322

(58) Field of Classification Search ................. 385/16, 385/40, 125, 129, 130; 359/320, 322
See application file for complete search history.

(56) References Cited

U.S. PATENT DOCUMENTS 5,526,449 A * 6/1996 Meade et al. .................. 385/14
6,064,506 A * 5/2000 Koops ......................... 359/237
6,175,671 B1 * 1/2001 Roberts ........................ 385/14
6,433,919 B1 8/2002 Chowdhury et al. ......... 359/332
6,542,654 B1 4/2003 Miller et al. .................. 385/16
6,542,682 B2 4/2003 Cotteverte et al. ........... 385/125
6,618,535 B1 9/2003 Reynolds ..................... 385/129
6,631,236 B2 * 10/2003 Yamada ....................... 385/129
6,674,949 B2 * 1/2004 Allan et al. .................. 385/129
6,697,542 B2 2/2004 Platzman et al. .............. 385/5

(Continued)

FOREIGN PATENT DOCUMENTS

JP    10-090634    4/1998

(Continued)

OTHER PUBLICATIONS

Hideo Kosaka et al., Photonic crystals for micro lightwave circuits using wavelenght-dependent angular beam steering, Applied Physics Letters, vol. 74, pp. 1370-1372 (Mar. 8, 1999).

(Continued)

*Primary Examiner*—Sung Pak
*Assistant Examiner*—Daniel Petkovsek
(74) *Attorney, Agent, or Firm*—Young & Thompson

(57) ABSTRACT

The present invention provides an optical switch having a photonic crystal structure. An optical switch of the invention has a slab optical waveguide structure whose core (35) has a two-dimensional photonic crystal structure where two or more media (33, 34) with different refractive indices are alternately and regularly arranged in a two-dimensional manner. The photonic crystal structure comprises: a line-defect waveguide; and means for altering the refractive index of the line-defect waveguide.

7 Claims, 6 Drawing Sheets

U.S. PATENT DOCUMENTS

| | | | |
|---|---|---|---|
| 2001/0026668 A1 | 10/2001 | Yamada | 385/129 |
| 2002/0021878 A1 | 2/2002 | Allan et al. | 385/129 |
| 2003/0011775 A1 | 1/2003 | Soljacic et al. | 356/450 |

FOREIGN PATENT DOCUMENTS

| | | |
|---|---|---|
| JP | 10-090638 | 4/1998 |
| JP | 11-330619 | 11/1999 |
| JP | 2000-506281 | 5/2000 |
| JP | 2000-508083 | 6/2000 |
| JP | 2001-516469 | 9/2001 |
| JP | 2002-196296 | 7/2002 |
| JP | 2002-350908 | 12/2002 |

OTHER PUBLICATIONS

Physical Review Letters, Optical Limiting and Switching of Ultrashort Pulses in Nonlinear Photonic Band Gap Materials, vol. 73, No. 10, Sep. 5, 1994, pp. 1368-1371.

* cited by examiner

Reciprocal lattice space

OPTICAL SWITCH HAVING PHOTONIC CRYSTAL STRUCTURE

CROSS REFERENCE TO RELATED APPLICATIONS

This application is a division of application Ser. No. 10/105,384, filed on Mar. 26, 2002, now U.S. Pat. No. 6,937,781 the entire contents of which are hereby incorporated by reference.

FIELD OF THE INVENTION

The present invention relates to an optical switch. More particularly, the present invention relates to an optical switch having a photonic crystal structure.

BACKGROUND OF THE INVENTION

Optical communication requires a mechanism for switching optical signals on and off in accordance with binary signals (i.e., 0 or 1). One of the simplest mechanisms is to directly control on and off of output of a semiconductor laser used as a light source. However, directly controlling on and off of the output of the semiconductor laser deteriorates oscillation stability of the semiconductor laser and above all high-speed switching as high as 10 Gbps (giga-bits/second) or more is difficult to achieve.

Another technique for controlling on and off of an optical signal is to use an optical switch. According to this technique, constant optical outputs from a semiconductor laser are modulated to be on and off by a device provided at a subsequent stage. This device is referred to as an optical switch. By using an optical switch, light intensity of the semiconductor laser light source can be kept constant. Therefore, a problem of unstable oscillation can be solved. The performance of the optical communication is not influenced by the modulation rate of the semiconductor laser itself.

Conventional optical switches include a compound semiconductor. Examples of known operation principles include:

one that utilizes quantum confined Stark effect that leads to a red shift of effective band gap by applying an electric field to a multi quantum well structure;

one that utilizes change in a refractive index of an active layer due to current injection or a reverse bias voltage application; and one that utilizes optical Kerr effect which is a third-order nonlinear optical effect.

The principle that utilizes quantum confined Stark effect allows some degree of design freedom according to a combination of well layers and barrier layers. However, the number of materials that can be selected by their intrinsic properties such as band-gap energy is limited, which results in limited operating wavelength range.

According to the principle that utilizes change in the refractive index, obtainable change in the refractive index is small. Therefore, in order to obtain sufficiently large difference between the signal light intensities of ON and OFF states, the length of the optical path needs to be as long as about several-hundreds of microns, which interferes with high-density integration.

An optical switch that utilizes optical Kerr effect is most likely to achieve high speed. However, this switch requires an additional high-power control light source for obtaining the optical Kerr effect, thereby rendering itself impractical.

As an optical switch that may overcome the above-mentioned problems, an optical switch that uses photonic crystal has recently been proposed. As one of the publications relating to the optical switch incorporating the photonic crystal, for example, Japanese Patent Laid-Open Application No. 10-90638 discloses a structure of an optical switch. This optical switch includes: a photonic band structure that forms a alternately structure on a two-dimensional plane with two types of optical media having different complex refractive indices where at least one of the optical media is a semiconductor; controlled light parallel to the two-dimensional plane; and means for radiating circularly-polarized light as control light to the alternately structure on the two-dimensional plane along an optical path that does not cross with an optical path of the controlled light, wherein the optical switch changes light transmission of the controlled light according to the control light.

A photonic crystal has at least two media with different refractive indices alternately and regularly arranged at a three- or two-dimensional on the order of the wavelength of light, namely, at a cycle of sub-micron meter. A photonic crystal has high design freedom and thus is receiving great attention as an artificial optical crystal having specific optical property.

FIG. 1A is a schematic view showing a two-dimensional photonic crystal as an exemplary structure of the photonic crystal. Here, cylinders made of a second medium 12 are imbedded in a first medium 11 in a two-dimensional triangular lattice arrangement. Such photonic crystal is known to form an energy band structure in response to the light wave present in the photonic crystal.

FIG. 1B is a schematic view showing a first Brillouin zone in a reciprocal lattice space corresponding to the triangular lattice shown in FIG. 1A. Point J is a vertex of the regular hexagon, point X is the midpoint of each side of the hexagon, and Γ is the center of the hexagon.

The solid lines in FIG. 2 represent the results obtained by calculating an energy band structure of the photonic crystal shown in FIG. 1A in Γ-X direction with respect to TM-polarized wave. The vertical axis of the diagram represents normalized $\Omega=\omega a/2\pi c$, where a is a lattice pitch (or a lattice constant), c is light velocity in a vacuum state, ω is angular frequency of the light wave, and k represents the magnitude of the wave vector.

In the energy band structure shown in FIG. 2, light wave mode for light traveling in the Γ-X direction does not exist in an energy range of $\Omega 1$-$\Omega 2$, where it is referred to as a "photonic band gap (PBG)."

The above-described optical switch disclosed in the Japanese Patent Laid-Open Application No. 10-90638 controls on and off of light propagating in the photonic crystal by controlling the PBG according to the change in the refractive index of the material. In this conventional example, since light with energy $\Omega 3$ is within the PGB, light cannot be propagated in the OFF state. The refractive index of the photonic crystal material is changed by externally radiating control light or by injecting current to the photonic crystal. As a result, the energy band structure defined by the solid lines in FIG. 2 alters to an energy band structure defined by the dashed lines where a propagation mode becomes effective for the light of $\Omega 3$ in the ON state. On the contrary, change in the refractive index alters the state of the light wave with energy of $\Omega 4$ from ON state to OFF state.

The above-described optical switch using a photonic crystal disclosed in Japanese Patent Laid-Open Application No. 10-90638 utilizes a small change in the refractive indices of the media. By setting the wavelength of the controlled light to the edge of the energy band, ON/OFF effect of the light (i.e., function of the optical switch) can be obtained.

The above-described optical switch using a conventional photonic crystal simply utilizes characteristic of the photonic crystal itself as a bulk structure, but have no regard to the guided wave of light necessary for actually forming an optical circuit, that is, optical confinement in a direction perpendicular to the light propagating direction. Therefore, a recovery efficiency of light that has propagated through the photonic crystal is considered to be extremely low.

In order to guide the wave of light efficiently, the photonic crystal may be shaped into a narrow waveguide with a width of 1 to 2 µm with which a basic propagation mode can be achieved. In this case, however, the energy band of the bulk structure no longer retains its shape shown in FIG. 2, and thus the photonic band gap necessary for ON/OFF control of the propagated light is no longer formed.

All of the above-described conventional optical switches control ON and OFF of a single channel with a single switch. Therefore, when a multi-channel configuration is considered, a plurality of optical switches need to be prepared for the number of channels.

Furthermore, the conventional optical switches control entire ON/OFF of light according to control signals such as current, voltage and light. Therefore, when the waveform of the control signal is deteriorated, the waveform of the light is deteriorated as well.

Thus, the present invention has an objective of providing an optical switch having a photonic crystal structure, which can propagate light efficiently and which can operate at high speed.

As can be appreciated from the following description, the present invention also has an objective of providing an optical switch, where a multi-channel optical switch that can switch among a plurality of channels with a single switch is realized to make a compact multi-channel switch, or where a waveform shaping function is realized that makes the light intensity to be predetermined range, when the signals are ON.

SUMMARY OF THE INVENTION

The present invention which provides means for solving the above-described problems is an optical switch having a slab optical waveguide whose core has a photonic crystal structure where two or more substances with different refractive indices are alternately and regularly arranged. The photonic crystal structure comprises: a line-defect waveguide; and means for altering the refractive index of the line-defect waveguide. Here, the slab optical waveguide. refers to a waveguide which includes a single- or multi-layered flat media and which allows light to propagate in a direction along the plane. According to the present invention, the refractive index may be altered by current injection or radiation of control light other than the incident light.

In another aspect of the invention, the photonic crystal structure comprises Mach-Zehnder interferometry using the line-defect waveguide, and means for altering the refractive index of the waveguide at one or both of two branched optical paths.

In yet another aspect of the invention, the photonic crystal structure comprises: means for refracting light by making incident light to be oblique with respect to the intrinsic axis of the photonic crystal; and means for altering the refractive index of the photonic crystal. The refractive angle of the photonic crystal is altered according to the change in the refractive index. According to the present invention, a multi-channel optical switch that can switch among a plurality of channels with a single optical switch is realized, thereby achieving a compact multi-channel switch.

In yet still another aspect of the invention, the refractive index of the photonic crystal alters according to the change in the intensity of light incident to the photonic crystal, whereby switching operation takes place. According to the invention, a waveform shaping function is realized for making the light intensity to be predetermined range, when the signals are ON.

In yet another aspect of the invention, in an optical switch using a line-defect waveguide of a slab photonic crystal: a core layer of the slab photonic crystal is an i-type, $n^-$-type or $p^-$-type semiconductor; the core layer has an n-type region and a p-type region sandwiching the line-defect waveguide; and the n-type region and the p-type region have an n-type ohmic electrode and a p-type ohmic electrode, respectively.

According to the present invention, the conductive type of a base material of the core layer is $n^-$-type or $p^-$-type, and an electrode of the same conductive type as the conductive type of the base material of the core layer and an ion-injected region are provided separately from the line-defect optical waveguide.

DETAILED DESCRIPTION OF THE INVENTION

Figure 3A:
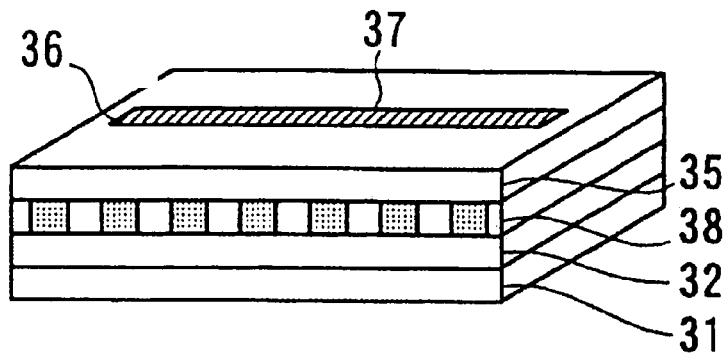
FIG. 3A is a schematic view showing a structure of a first embodiment of the invention.
Figure 3B:
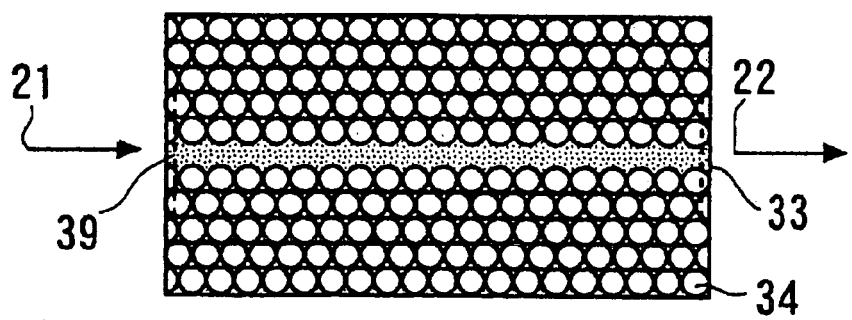
FIG. 3B is a schematic view showing a structure of a photonic crystal layer in the first embodiment shown in FIG. 3A.

Hereinafter, embodiments of the present invention will be described with reference to the drawings. FIG. 3A is a schematic view showing a structure of a first embodiment of the invention, and FIG. 3B is a plan view showing a photonic crystal layer 38.

Referring to FIG. 3A, an n-type semiconductor clad layer 32, and the photonic crystal layer 38 including i-type semiconductors 33 (base medium) and 34 having different refractive indices are formed on an n-type substrate 31 in this order.

A p-type semiconductor clad layer 35 is further provided on the photonic crystal layer 38, together with an electrode 36 and a lead wire 37 for current injection. The n-type substrate 31 is held at ground potential.

The i-type semiconductor (base medium) 33 is imbedded with cylinders made of the i-type semiconductor 34 in a two-dimensional triangular lattice (to have a alternately structure). There is a linear region where a row of the i-type semiconductor 34 is replaced with the base medium 33 in a direction along an input end to an output end of incident light 21. Hereinafter, this region 39 is referred to as a "line-defect waveguide." The i-type semiconductor cylinders 34 may be replaced with air, vacuum or an insulator.

Specifically, the optical switch having the photonic crystal structure shown in FIGS. 3A and 3B may be produced, for example, as follows.

First, an n-type InGaAsP clad layer 32 and an i-type InGaAsP semiconductor 33 are deposited on an n-type InP substrate 31, for example, by metalorganic chemical vapor deposition (MOCVD) or molecular beam epitaxy (MBE). The i-type semiconductor 33 has a thickness of about 0.3 to 0.5 μm.

Next, a mask pattern for a two-dimensional triangular lattice is formed on the i-type semiconductor 33 to provide cylindrical holes for achieving photonic crystal by etching.

After the etching, the mask is removed and i-type InP is grown with which the cylindrical holes are filled in preferentially, thereby forming an i-type semiconductor 34.

Then, a p-type InP clad layer 35 is further deposited, and an electrode 36 and a lead wire 37 are provided.

Alternatively, after etching and removing the mask away, a substrate that has been deposited with a p-type InP clad layer 35 may be placed on the i-type InGaAsP semiconductor 33 so as to leave the p-type clad layer 35 through etching. In this case, the i-type semiconductor 34 is replaced by air. The electrode and the lead wire are attached as described above.

Figure 4:
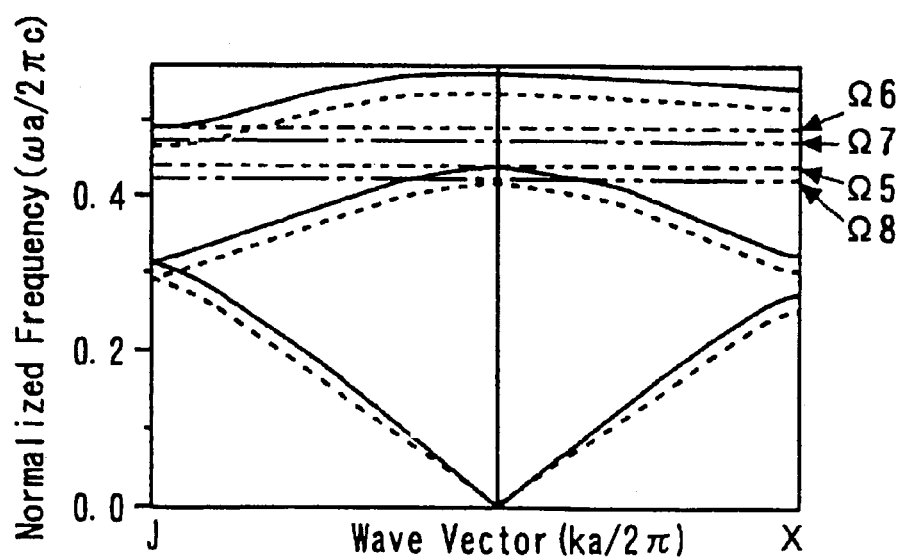
FIG. 4 is a diagram showing results of an exemplary calculation for energy bands of the structure shown in FIG. 3.

Hereinafter, operation principle of the first embodiment of the invention will be described. FIG. 4 is a diagram showing energy bands for TM-polarized wave. Herein, only TM-polarized wave is argued.

When no change in the refractive index is caused upon current injection or the like in a photonic crystal region other than the line-defect waveguide, an energy band structure will be as defined by the solid lines in FIG. 4. There is no propagation mode on the two-dimensional plane for light wave of $\Omega 5$ to $\Omega 6$.

Accordingly, when the energy of the incident light 21 is $\Omega 5$ to $\Omega 6$, light cannot propagate on the two-dimensional plane outside the waveguide, namely, the photonic crystal region. Therefore, the light is highly confined in the above-described line-defect waveguide. For example, light with energy of $\Omega 7$ applies to this case. Thus, a minute waveguide as small as about sub-μm which is identical to the size of the lattice pitch can be realized.

With respect to a direction perpendicular to the two-dimensional plane, light can be confined efficiently in the photonic crystal layer, or a core structure, by appropriately selecting the refractive index and the thickness of the upper and lower clad layers 32 and 35. The optical switch of the present example is able to confine light in a three-dimensional manner, by which light can propagate and be emitted as light 22 with less loss.

Hereinafter, a case where current injection is carried out will be described. When the number of carriers in the photonic crystal layer changes (due to plasma effect), a refractive index of at least one of the i-type semiconductors 33 and 34 alters, by which the energy band changes as defined by the dashed lines shown in FIG. 4. Since light with energy $\Omega 7$ is outside the photonic band gap (PBG) in this case, light leaks to a complete photonic crystal region outside the line-defect waveguide, and as the light propagates through the line-defect waveguide, intensity of the light is attenuated and thus the intensity of the transmitted emitted light 22 becomes extremely weak.

Based on the same principle, on the contrary to light with energy $\Omega 7$, when the energy of the incident light 21 is $\Omega 8$, the intensity of the emitted light changes from OFF state to ON state due to current injection.

Figure 5:
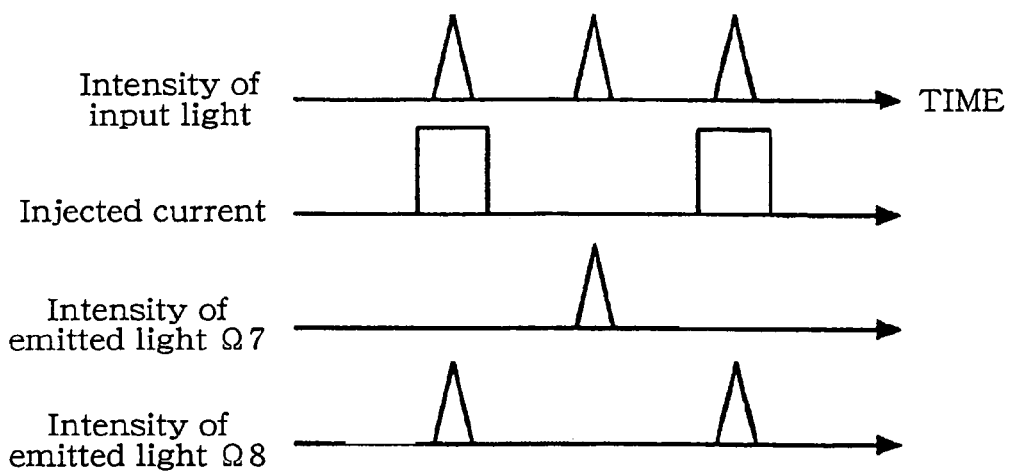
FIG. 5 is timing charts for illustrating operations of the first embodiment of the invention.

FIG. 5 shows timing charts representing intensities of emitted light upon ON/OFF of current (i.e., upon presence or absence of current injection). When current is injected via the electrode 36, the intensity of the emitted light with energy $\Omega 7$ (intensity of emitted light $\Omega 7$ in FIG. 5) is zero, i.e., in an OFF state. When the current is not injected, the light is in an ON state. The timing of the ON/OFF states of the intensity of emitted light with energy $\Omega 8$ (intensity of emitted light $\Omega 8$ in FIG. 5) is opposite to that of the ON/OFF states of the emitted light with energy $\Omega 7$.

Although two-dimensional triangular lattice is used as an example of the photonic crystal of the present example, the photonic crystal may take other two-dimensional photonic crystal structure such as a square lattice or a regular hexagonal lattice, or a three-dimensional photonic crystal structure such as a diamond structure.

Although InGaAsP is used as a material for the photonic crystal, other material can also be used. Although current injection by forward bias application is employed to change the refractive index in the present example, equal effect can be obtained when the refractive index is altered by reverse bias application (Franz-Keldish effect).

Figure 11:
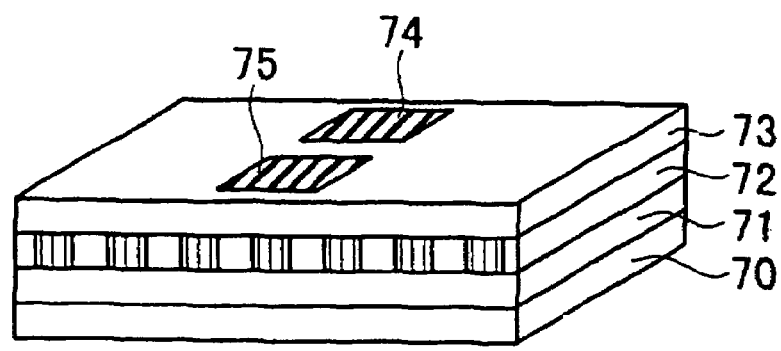
FIG. 11 is a schematic view showing a structure of a second embodiment of the present invention.

Hereinafter, a second embodiment of the present invention will be described. FIG. 11 is a schematic view showing a structure of the second embodiment of the invention. Referring to FIG. 11, a core layer 72 having a alternately structure of photonic crystal sandwiched by upper and lower clad layers 71 and 73 is formed on a substrate 70.

This structure differs from that of the first embodiment in that the substrate 70 can be made of any material and that the clad layers 71 and 73 are dielectric layers. Electrodes 74 and 75 are provided on the surface of the clad layer 73.

The core layer having a alternately structure of photonic crystal sandwiched by the clad layers, in order words, a combination of the core layer 72 and the clad layers 71 and 73 shown in FIG. 11 is sometimes referred to as a "slab photonic crystal." The clad layers 71 and 73 may be air.

The core layer 72 is made of a semiconductor, and is of i-type, n⁻-type (weak n-type) or p⁻-type (weak p-type) with low conductivity and small conductivity loss.

The clad layer 73 has holes through which the electrodes 74 and 75 make contact with electrodes 80 and 81 on the core layer 72.

Figure 12:
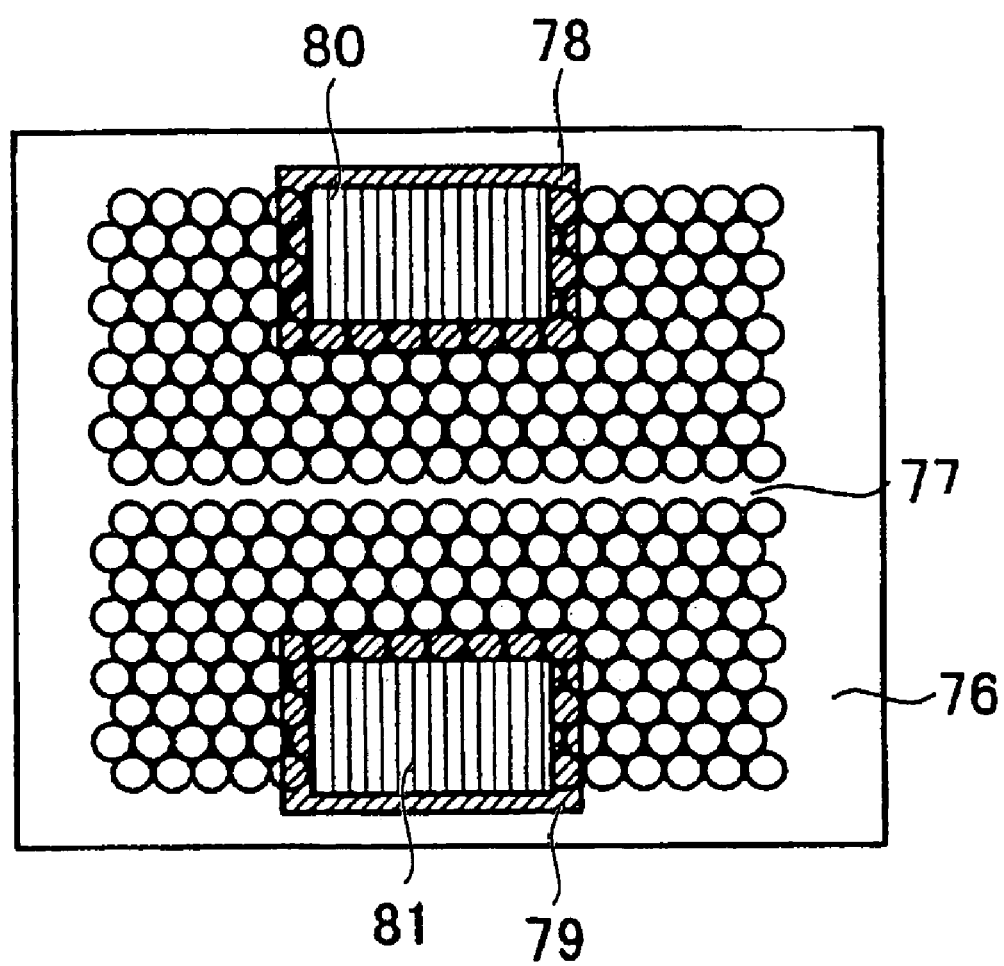
FIG. 12 is a schematic view showing a structure of the second embodiment of the present invention.

FIG. 12 is a top perspective view showing the structure of the second embodiment of the invention shown in FIG. 11. The i-type, n⁻-type or p⁻-type semiconductor core layer 76 has a photonic crystal structure and is provided with a line-defect optical waveguide 77.

On both sides of the line-defect optical waveguide 77, an n-type region 78 and a p-type region 79 are provided, each having an n-type ohmic electrode 80 and a p-type ohmic electrode 81, respectively.

The operation principle of the second embodiment of the invention is the same as that of the first embodiment. Specifically, energy of the optical signal to be switched is within the photonic band gap of the slab photonic crystal. The line-defect optical waveguide formed in the photonic crystal has a propagation mode in the photonic band gap prior to current injection or voltage application to the electrodes.

When current is injected or a reverse bias voltage is applied between the electrodes 80 and 81, the photonic band structure of the photonic crystal around the line-defect optical waveguide changes, by which the propagation mode of the line-defect waveguide becomes to be outside the photonic band gap, whereby light can no longer propagate through the line-defect waveguide.

Alternatively, the propagation mode of the line-defect waveguide that exists outside the photonic band gap in the first place may become to be within the photonic band gap due to current or voltage application, allowing light to propagate therethrough.

One of the advantages of the second embodiment of the invention is that the clad layers can be made of a non-conductive dielectric. Accordingly, there is no loss of light propagating through the line-defect waveguide 77 due to the clad layers 71 and 73.

Hereinafter, a specific example of the second embodiment of the present invention will be described. The triangular lattice photonic crystal structure and the line-defect waveguide as shown in FIG. 12 are formed in a non-doped Si-layer of an SOI wafer having a structure of non-doped Si (thickness 300 nm)/SiO$_2$ (thickness 2 micro meter)/non-doped Si-substrate by Si dry etching fabrication using electron beam lithography and chlorine gas.

After forming a mask by photolithography, arsenic or boron ion injection and subsequent annealing for activation are conducted to form regions corresponding to the n-type region 78 and the p-type region 79. Then, an ohmic metal is deposited on each of the ion-injected region to form electrodes by sintering. The ion injection for forming the n-type region 78 and the p-type region 79 may be performed prior to the fabrication of the photonic crystal structure. When the conductive type of the base material of the core layer is n$^-$-type or p$^-$-type semiconductor, the electrode (as well as the ion-injected region) having the same conductive type as the conductive type of the base material of the core layer does not need to be in the vicinity of the line-defect optical waveguide but away from it.

When a plurality of optical switches of the present embodiment are to be arranged, only an electrode having a opposite conductive type to that of the core layer may be provided in the vicinity of each line-defect waveguide while at least one electrode having the same conductive type as that of the core layer may be provided as a common electrode separated from the line-defect waveguides.

Figure 6:
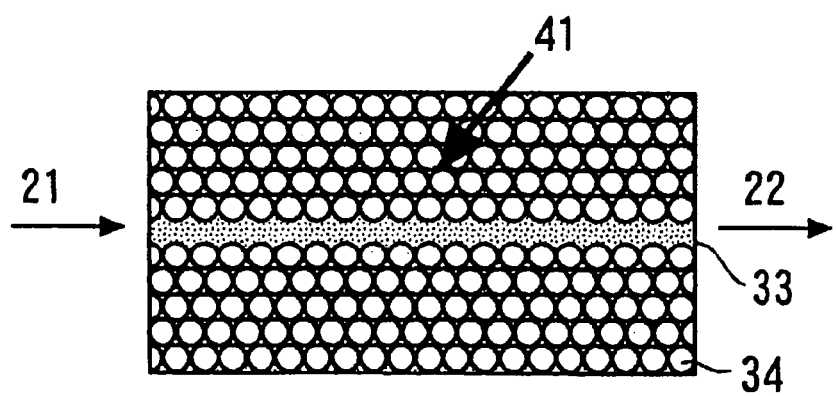
FIG. 6 is a schematic view showing a structure of a third embodiment of the present invention.

Hereinafter, a third embodiment of the invention will be described. FIG. 6 is a schematic view showing a structure of the third embodiment of the invention. Referring to FIG. 6, the structure of the present embodiment differs from that of the first embodiment shown in FIG. 3 in that, control light 41 which is different from the incident light 21 is used for altering the refractive index of the semiconductor as the photonic crystal.

The operation principle of the third embodiment of the invention will be described. Referring to the energy band shown in FIG. 4, the solid lines define an energy band of the case where the control light 41 is not radiated, while the energy band alters, for example, as defined by the dashed lines in FIG. 4 when the control light 41 is radiated and carriers are excited to alter the refractive index of the i-type semiconductor 33 or 34 as the photonic crystal. Accordingly, in the same manner as the first embodiment of the invention, when the energy of the incident light 21 is Ω7, the output light 22 can be switched on or off according to the presence or absence (ON or OFF) of the control light 41.

Change in the number of carriers in the photonic crystal (plasma effect) is one factor that causes alteration of the refractive index by light radiation. In addition, optical Kerr effect as the third-order nonlinear optical characteristic of the medium may be another factor. Optical Kerr effect is a phenomenon represented by the following equation (1).

$$n = n0 + n2*I \quad (1)$$

where n is a refractive index of the medium under radiation of the control light 41, n0 is a refractive index under no radiation, n2 is a value proportional to a third-order nonlinear optical constant, and I is light intensity.

Figure 7:
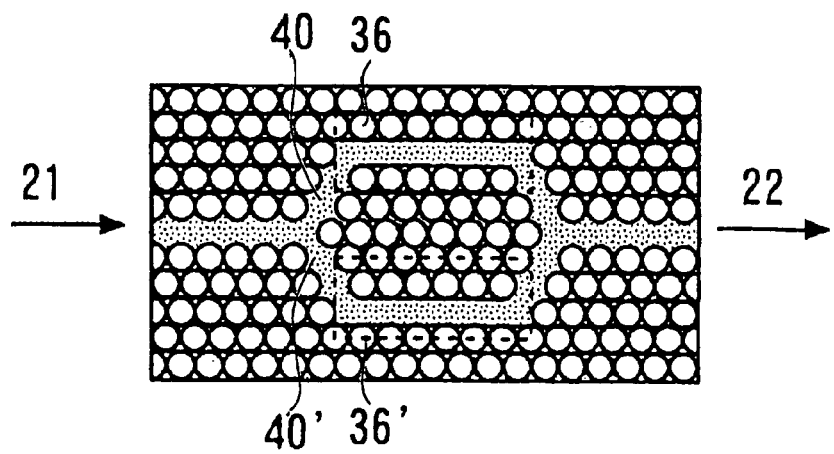
FIG. 7 is a schematic view showing a structure of a fourth embodiment of the present invention.

Hereinafter, a fourth embodiment of the present invention will be described. FIG. 7 is a plan view of a photonic crystal structure according to the fourth embodiment of the invention. Referring to FIG. 7, the present embodiment uses a line-defect waveguide to establish Mach-Zehnder interferometry. Two electrodes 36 and 36' are attached such that carriers can be injected efficiently into the two branched channels.

Next, operation principle of the fourth embodiment of the invention will be described. The incident light 21 is split at a Y-shaped junction of the line-defect waveguide to be transmitted through two optical paths 40 and 40' as upper and lower branches. The beams that propagate through the two optical paths are recombined at the other Y-shaped junction and output as emitted light 22. Since the lengths of the optical paths of the upper and lower branches are equal when no current is injected, the phase difference between the two branched beams is zero (in-phase), and thus the intensity of the output light 22 (which is the coherent light of the recombined beams) is the maximum. Even when the lengths of the two optical paths are different, the phase difference is equivalent to zero as long as the difference between the lengths of the optical paths is a multiple of the wavelength.

When a current is injected through at least one of the electrodes of the upper and lower branches to alter the refractive index, the effective optical path length of that part changes. When a phase difference n is caused between the optical paths 40 and 40' of the upper and lower branches, the recombined beams as the coherent light weakens each other and the intensity of the output light 22 becomes the minimum.

Accordingly, the emitted light 22 can be switched on/off according to on/off of the current injection. In order to alter the refractive index, instead of current injection, application of a reverse bias, or radiation of control light other than the incident light may also be employed.

Figure 8:
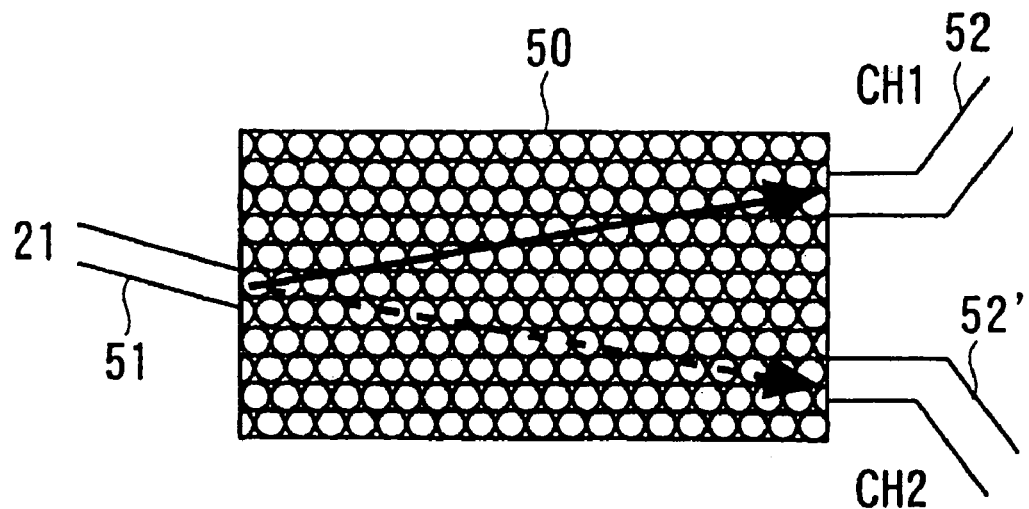
FIG. 8 is a schematic view showing a structure of a fifth embodiment of the present invention.

Hereinafter, a fifth embodiment of the invention will be described. FIG. 8 is a schematic view showing the fifth embodiment of the invention. Referring to FIG. 8, a photonic crystal 50 is a perfect crystal with no line-defect waveguide. This is an optical switch utilizing a super prism phenomenon. As described in a document (Applied Physics Letters vol. 74, pp. 1370-1372 (1999)), the super prism phenomenon has an anomalous dispersion characteristic where its refractive angle changes by 50 degrees or more with a wavelength difference of only 1%.

In other words, when the refractive index is slightly altered while the wavelength of the incident light is fixed, the energy band changes and due to which the refractive angle changes greatly.

Next, operation principle of the fifth embodiment of the invention will be described with reference to FIG. 8. Light that is incident, prior to current injection, to the photonic crystal 50 via the waveguide 51 in an oblique manner with respect to the intrinsic axis (Γ-X or Γ-J) of the photonic crystal 50 propagates through the photonic crystal as indicated by the solid arrow in FIG. 8 due to scattering characteristic of the photonic crystal. In this case, the light is output to the waveguide 52 of channel 1 (ch1).

Upon current injection, the refractive index of the medium forming the photonic crystal changes, by which the refractive angle also changes. As a result, the path of the propagating light changes as represented by the dashed arrow shown in FIG. 8 and the light is output to the waveguide 52' of channel 2 (ch 2).

Although the case where two waveguides are used on the output side is described in the above-described example, the number of the waveguides used may be one, or three or more. Of course, instead of current injection, the refractive index may be altered by other means such as application of a reverse bias or radiation of control light other than the incident light.

Figure 9:
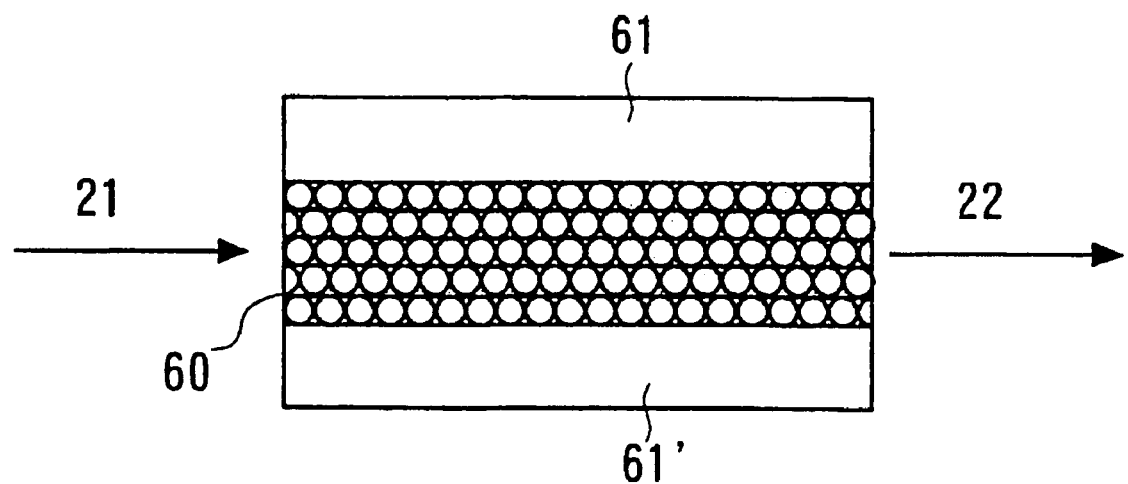
FIG. 9 is a schematic view showing a structure of a sixth embodiment of the present invention.

Hereinafter, a sixth embodiment of the present invention will be described. FIG. 9 is a schematic view showing a structure of the sixth embodiment of the invention The photonic crystal serves as a waveguide 60 with a width of about 1 to 2 micro meter in the direction perpendicular to the light propagating direction in a two-dimensional plane. The waveguide 60 is sandwiched by clad layers 61 and 61'. The sixth embodiment of the invention performs switching according to the intensity of the incident light 21 itself.

Next, operation principle of the sixth embodiment of the invention will be described with reference to FIGS. 4, 10A and 10B.

First, a case where the energy of the incident light 21 is Ω8 (see FIG. 4) will be described. When the intensity of the incident light is weak, the energy band will be as represented by the solid lines in FIG. 4, where the energy of the light is outside the PBG and thus the light can propagate through the complete crystal waveguide. However, when the intensity of the incident light becomes stronger to some extent, the refractive index of the photonic crystal alters due to the intensity of the incident light itself as can be appreciated from Equation (1), according to which the energy band alters as represented by the dashed lines shown in FIG. 4 where the energy of the light falls within the photonic band gap (PBG), whereby the light can no longer propagate.

Figure 10A:
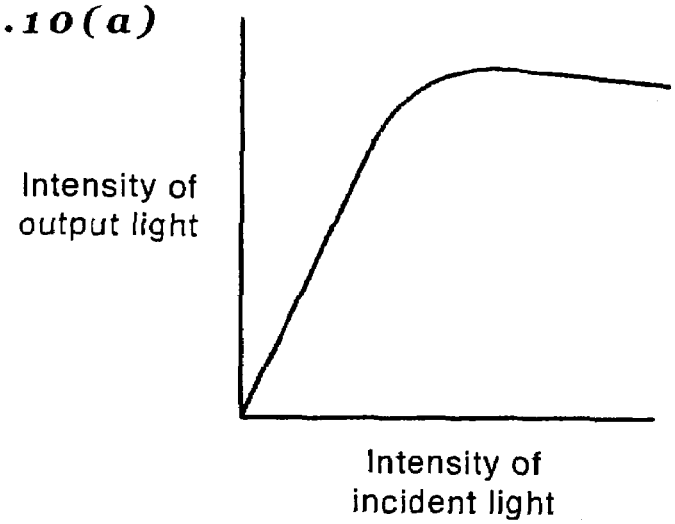
FIGS. 10A and 10B are diagrams for illustrating operations of the sixth embodiment of the present invention.

FIG. 10A is a graph in which intensities of the emitted lights are plotted with respect to the intensity of the incident light with energy Ω8 based on the above-described example. When the intensity of the incident light becomes stronger to some extent, the emitted light reaches the limit and subsequently declines gradually. This may be assumed as a limiter function. The limiter function may be utilized as a shaping function for making the intensity of the light to be predetermined range, when the signals are ON.

Figure 10B:
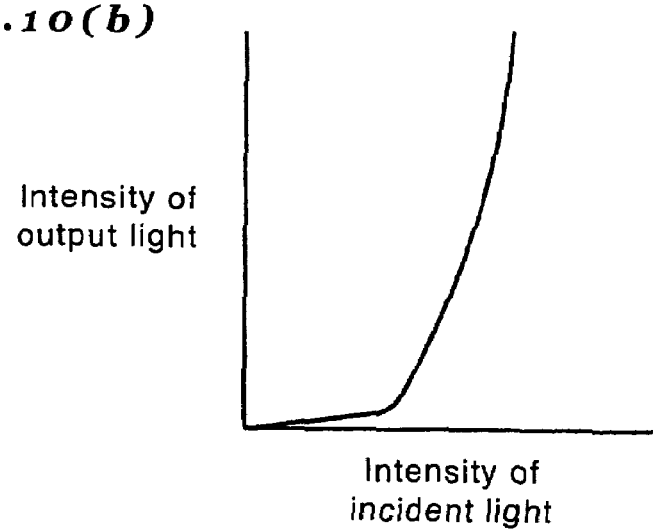

On the contrary to the case of incident light with an energy of Ω8, for incident light with an energy of Ω7 (see FIG. 4), the intensity of the transmitted light is decreased when the intensity of the incident light is weak while the intensity of the transmitted light greatly increases when the intensity of the incident light is strong as shown in FIG. 10B. This may be assumed as a function that increases the contrast of the signal light intensities between on and off states. Of course, the limiter function and the contrast increasing function can be combined.

Figure 1A:
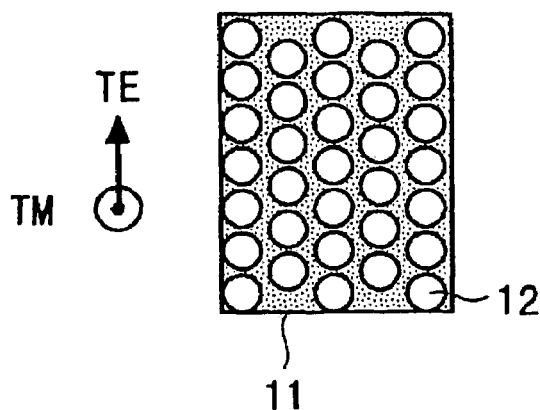
FIG. 1A is a plan view showing an exemplary structure of a two-dimensional photonic crystal.
Figure 1B:
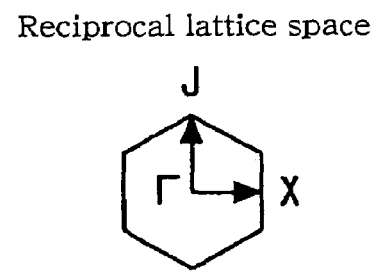
FIG. 1B is a schematic diagram showing vectors of a reciprocal lattice with respect to the two-dimensional photonic crystal.
Figure 2:
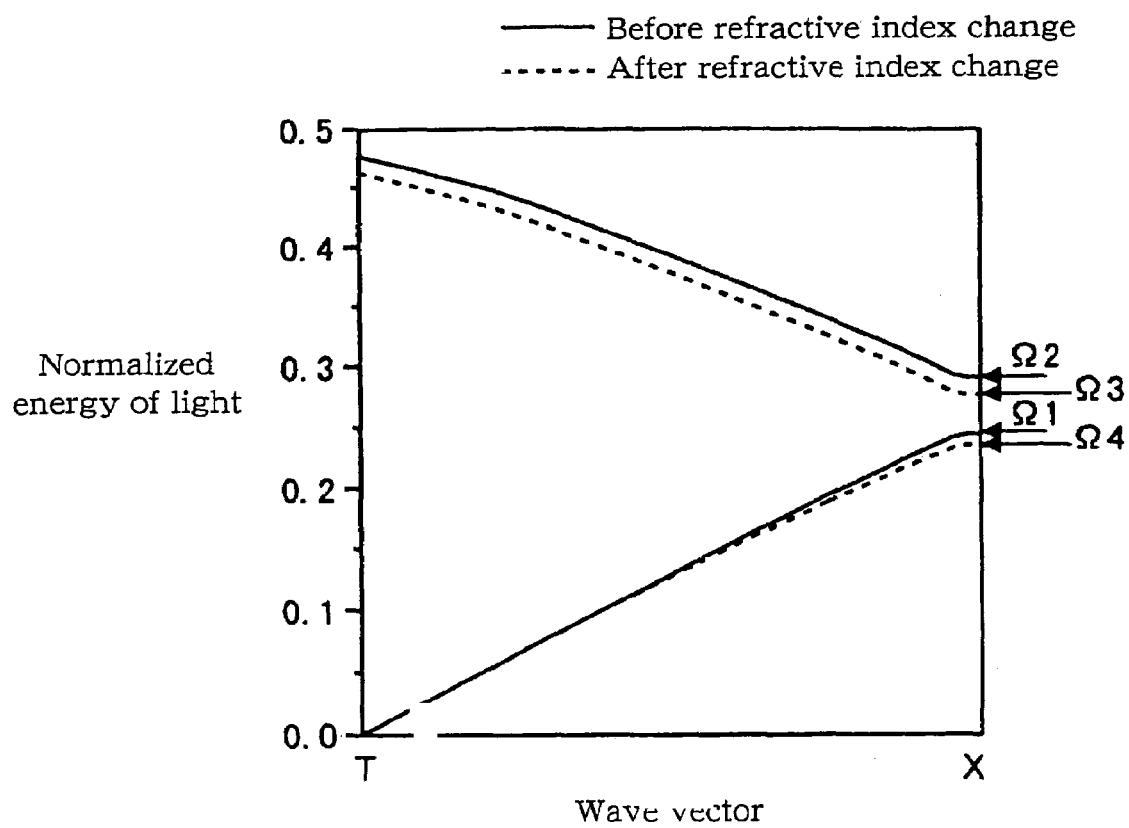
FIG. 2 is a diagram showing results of an exemplary calculation for energy bands of the structure shown in FIG. 1A.

Similar to the embodiments of the first and second embodiments described with reference to FIGS. 1A, 1B and 11, the core layer having the photonic crystal structure in the above-described third to sixth embodiments can also be sandwiched by upper and lower clad layers.

According to each embodiment, the operating wavelength for switching is determined not by the characteristic of the structural material but by the structure of the photonic crystal, which gives more design freedom. By using a photonic crystal, a compact functional element can be realized. Since a flat micro-optical circuit, a semiconductor laser and the like used in optical communication have waveguide structures, the photonic crystal preferably has a waveguide structure as well.

According to the present invention, light is confined in a three-dimensional manner to efficiently guide the light, and thus the present invention has an advantage of enabling high-speed operations. Furthermore, since the operating wavelength for switching is determined not by the characteristic of the structural material but by the structure of the photonic crystal, the design freedom is increased.

According to the present invention, a multi-channel optical switch which can switch among a plurality of channels with a single optical switch is realized, thereby realizing a compact multi-channel switch.

According to the present invention, a waveform shaping function is realized which can make the light intensity to be predetermined range when the signal is ON.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and rage of equivalency of the claims are therefore intended to be embraced therein.

The entire disclosure of Japanese Patent Application No. 2001-106318 (Filed on Apr. 4, 2001) including specification, claims, drawings and summary are incorporated herein by reference in its entirety.

The invention claimed is:

1. An optical switch having a
   branched-type interferometer structure, comprising:
   a photonic crystal structure having at least first and second optical media with different refractive indices where the second optical medium is regularly arranged in the first optical medium to form a alternately structure at least on a two-dimensional plane,
   wherein the photonic crystal structure has a region as a waveguide where the second optical medium is replaced by the first optical medium for a width of at least a single line, and
   wherein the single waveguide extending from the input end branches into two branch waveguides at a first Y-shaped junction, which are recombined into a single waveguide again at a second Y-shaped junction and extends to the output end, each branch waveguide having an electrode, and wherein the refractive index of the photonic crystal structure changes and the output of an optical signal of the light incident to the input end is switched on and off by making the optical signals between the two waveguides to be in phase or by causing phase difference therebetween by subjecting the electrodes corresponding to the two branch waveguides of the optical paths to current injection, application of a reverse bias voltage or radiation of control light other than the incident light.

2. An optical switch according to claim 1, wherein clad layers are provided on upper and bottom surfaces of the two-dimensional plane having the alternately structure of the photonic crystal structure.

3. An optical switch having a branched-type interferometer structure, comprising:

a photonic crystal structure having at least first and second optical media with different refractive indices where the second optical medium is regularly arranged in the first optical medium to form a alternately structure at least on a two-dimensional plane, wherein the photonic crystal structure has a region as a waveguide where the second optical medium is replaced by the first optical medium for a width of at least a single line, and wherein the single waveguide extending from the input end branches into two branch waveguides at a first Y-shaped junction, which are recombined into a single waveguide again at a second Y-shaped junction and extends to an output end emitting switched light, each of the two branch waveguides having an electrode, and wherein the refractive index of the photonic crystal structure changes and the emitted light output at the output end is switched on and off by making the optical signals between the two waveguides to be in phase or by causing phase difference therebetween by subjecting at least one of the two electrodes of the two branch waveguides to one of current injection and application of a reverse bias voltage.

4. The optical switch of claim 3, wherein, the refractive index of the photonic crystal structure changes and the output of an optical signal of the light incident to the input end is switched on and off by making the optical signals between the two waveguides to be in phase or by causing phase difference therebetween by subjecting at least one of the two electrodes of the two branch waveguides to the current injection.

5. The optical switch of claim 3, wherein, the refractive index of the photonic crystal structure changes and the output of an optical signal of the light incident to the input end is switched on and off by making the optical signals between the two waveguides to be in phase or by causing phase difference therebetween by subjecting both of the two electrodes of the two branch waveguides to the current injection.

6. The optical switch of claim 3, wherein, the refractive index of the photonic crystal structure changes and the output of an optical signal of the light incident to the input end is switched on and off by making the optical signals between the two waveguides to be in phase or by causing phase difference therebetween by subjecting at least one of the two electrodes of the two branch waveguides to the application of the reverse bias voltage.

7. The optical switch of claim 3, wherein, the refractive index of the photonic crystal structure changes and the output of an optical signal of the light incident to the input end is switched on and off by making the optical signals between the two waveguides to be in phase or by causing phase difference therebetween by subjecting both of the two electrodes of the two branch waveguides to the application of the reverse bias voltage.

\* \* \* \* \*